Nov. 25, 1969    P. SILLANO    3,480,813
ADJUSTABLE BRUSH HOLDER ASSEMBLY FOR COMMUTATOR OF
ELECTRIC MOTORS
Filed Oct. 19, 1967

INVENTOR
PIETRO SILLANO
BY
Stevens, Davis, Miller & Mosher
ATTORNEYS

United States Patent Office 3,480,813
Patented Nov. 25, 1969

3,480,813
ADJUSTABLE BRUSH HOLDER ASSEMBLY FOR COMMUTATOR OF ELECTRIC MOTORS
Pietro Sillano, Pavia, Italy, assignor to Necchi Societa per Azioni, Pavia, Italy
Filed Oct. 19, 1967, Ser. No. 676,524
Claims priority, application Italy, Feb. 6, 1967, 32,401/67
Int. Cl. H02k 13/00; H01r 39/44
U.S. Cl. 310—241                    2 Claims

ABSTRACT OF THE DISCLOSURE

An angularly adjustable brush holder assembly for electric motors comprising a rotatable brush holder housing which includes a circular worm wheel segment which engages a worm shaft which in turn is rotatably mounted on the motor frame, whereby rotation of the worm shaft effects an angular displacement of the brush holder housing.

---

This invention relates to a brush holder assembly for electric motors of the type which have a commutator, such as fractional horse power, single phase motors, the brush holder assembly being especially designed to be adjustable whereby the brush axis may be varied in very fine increments.

Specifically, this invention is directed to a means for adjusting the position of the commutator brushes relative to the neutral axis of the motor, in order to change the speed-torque characteristic of the motor to conform it to the speed-torque characteristic of the machine which is driven by said motor.

It is well known that motor torque, in motors of the type herein mentioned, diminishes from a maximum value, which is obtained when the brush axis coincides with the neutral axis, to a minimum or null value when the brush axis coincides with the magnetic field axis. Various intermediate torque values are achieved by positioning the brush axis at respective various positions between said neutral and magnetic axes.

In order to be able to selectively position the brushes at any desired position relative to the neutral axis, a means is required whereby the brush holder assembly could be rotated about the motor shaft axis. The problem, however, is that of achieving very fine angular displacements of the brush holder assembly and, therefore, it has been sought to devise some step-down or reducing means whereby the action of a person performing the adjustment would be stepped-down to a relatively fine displacement of the brush holder assembly.

Heretofore, the known means proposed for this purpose have suffered from various disadvantages such as their being relatively complex and costly and in their not providing a quick and accurate fine adjustment of the brush holder assembly. In fact, according to the prior art, it is frequently necessary to move the brush holder assembly back and forth a plurality of times before the desired position is finally achieved.

An object of this invention, therefore, is to provide an adjustable brush holder assembly and an adjustment means therefor which is adapted to provide very fine adjustments of said assembly.

A more specific object of this invention is to provide a reduction means for translating an actuating motion by a person who is making the adjustment into a relatively small angular displacement of said brush holder assembly.

A further object is to achieve the aforementioned objects through an arrangement which is simple to construct and to operate and, therefore, economical as well as reliable.

A still further object is to provide a brush holder adjustment means which makes it possible to quickly and accurately displace the brush holder assembly to a desired position in one movement thereof and without having to shift the holder assembly back and forth a plurality of times before that desired position is achieved.

Other objects are those which are obvious or inherent in a device of the type disclosed herein.

The following is a detailed description of a preferred embodiment of an arrangement according to the invention which description is referred to the accompanying drawing wherein.

Figure 1:
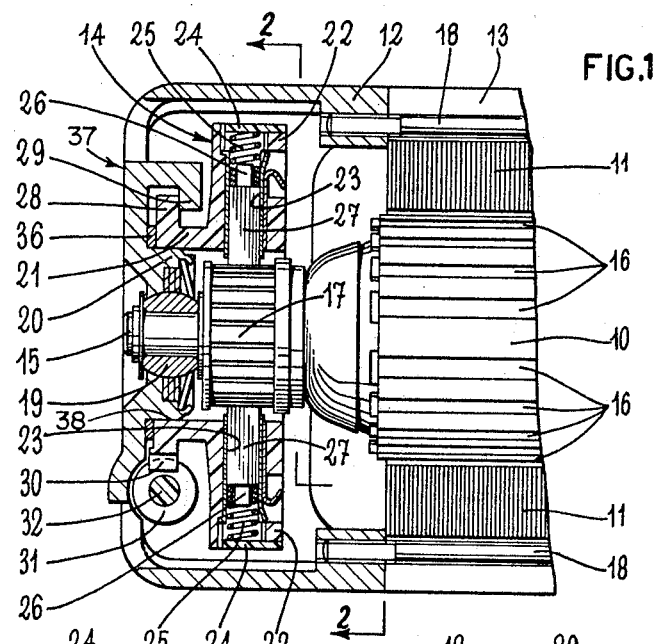
FIGURE 1 is a partial side sectional view of a motor having a brush holder assembly according to this invention incorporated therein.

With reference to the figures, the motor includes the rotor 10, the stator 11, the frame which is divided into two portions 12, 13 and the brush holder assembly 14.

The rotor 10, rigidly mounted on motor shaft 15, has on its cylindrical surface the grooves 16 in which the conductors of the rotor winding are positioned.

The commutator 17 is mounted on the motor shaft 15.

The stator 11 surrounds the rotor and is held in position by bolts 18 provided for rigidly connecting the two frame portions 12 and 13 together.

The motor shaft 15 is supported in the portion 12 of the frame by a self-aligning bearing 19.

The same arrangement is provided for supporting the other end (not shown) of the shaft 14 on the frame portion 13.

A mounting means 37 is provided at one axial end of the motor in frame portion 12 for rotatably supporting the brush holder assembly 14. Specifically, the mounting means 37 comprises a member which is fixed in the end of frame portion 12, said member including an axially inwardly extending boss portion 20 which defines a bore within which is mounted the shaft bearing 19 and whose external surface 38 constitutes a bearing surface around which is rotatably mounted the support housing 21 of the brush holder assembly 14.

The brush holder housing 21 includes a radially extending circular rim 28, a circumferential portion of which is formed as a worm wheel segment having teeth 30 (FIGURES 2 and 3) which mesh with a worm gear 31 formed on worm shaft 32.

The brush holder housing is held in fixed axial position by virtue of the fact that portions of its rim 28 are axially confined in circumferentially spaced apart grooves in mounting means 37, said grooves being of limited circumferential extent and being defined by circumferentially spaced apart bracket portions 29 of said mounting means 37. A ring 36 of a material having a high coefficient of friction fits between two of the facing surfaces of mounting means 37 and brush holder housing 21 with such a degree of tightness that said housing 21 is held against any unwanted rotation relative to housing 37 which may be induced by vibrations in the moving parts.

On the other hand, the brush holder housing 14 can be rotated relative to fixed mounting means 37 through rotation of worm shaft 32 which extends perpendicularly to the axis of the motor shaft an which is freely rotatably mounted in fixed bearing means 33 and 34 which form part of the frame portion 12. The machine operator can conveniently rotate worm shaft 32 by inserting a screw driver tip into slot 35 which is formed in one end of said worm shaft. Excepting for any play which may exist between the teeth 30 and the worm 31, the worm shaft 32 also serves to maintain the brush holder housing 21 in fixed position when said shaft is not being turned by the machine operator.

The brush holder assembly 14 includes two brush holder portions 22 in which the brush slides 23 are arranged. Removable cap members 24, placed over the upper end of each slide, have the function of holding the helicoidal springs 25 positioned within the slides 23 and of acting as an abutment surface for said springs. An end winding of each of said springs is wound on the tang 26 of a respective brush 27.

The springs 25 press the brushes against the outward cylindrical surface of the commutator 17.

Figures 2, 3:
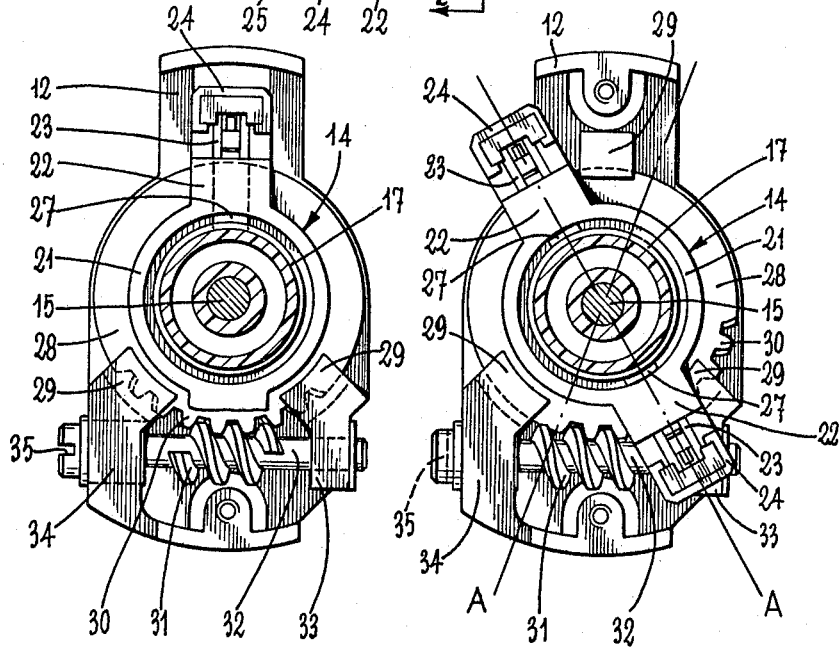
FIGURE 2 is an end sectional view taken along line 2—2 of FIGURE 1.
FIGURE 3 is a view analogous to FIGURE 2 except that the brush holder assembly is shown rotated to a different position relative to its position as shown in FIGURE 2.

It is seen, therefore, that the brush axis may be easily, quickly, and accurately displaced in minute increments simply by turning the worm shaft 32, such turning of the worm shaft overcoming the resistance which is offered by the frictional surface-to-surface contact between ring 36 and housing 21. As is seen in FIGURES 2 and 3, the brush axis may be shifted from a vertical position, which corresponds to the neutral axis, to any position up to either of the two circumferentially opposite positions A (FIGURE 3).

The details presented herein with reference to a preferred embodiment of the invention are for purposes of illustration and are not intended to be limitative of the scope of the invention which is defined in the claims as originally filed or as subsequently amended.

What is claimed is:

1. An electric motor having a rotor shaft, a stator frame, a commutator and a brush holder assembly associated therewith, said assembly being adjustably rotatable coaxially with the rotor shaft, an adjustment means for varying the angular position of said assembly relative to the neutral axis of the motor, said adjustment means comprising a hand-actuable adjustment member and a reduction type driving engagement between said adjustment member and said assembly, whereby actuation of said adjustment member correspondingly reduces angular displacement of said assembly about the rotor axis, said adjustment member being a worm shaft rotatably mounted about a fixed axis extending transversely to the rotor shaft axis, and said adjustment means further comprising a worm wheel portion forming part of said rotatable brush holder assembly, a worm on said worm shaft in driving engagement with said worm wheel portion, said brush holder assembly having a brush holder housing which includes diametrically opposed slides for holding brushes therein, a circular rim rigidly connected to said slides, said rim defining outer and inner circumferential surfaces, respectively, said outer surface defining said worm wheel portion, said stator frame including a circular external bearing surface concentric with the rotor axis, said inner circumferential surface of said rim being rotatably supported about said external bearing surface, said stator frame further including axially spaced apart portions defining an arcuate groove, said rim extending radially into said groove and being axially confined between said axially spaced apart portions of said frame.

2. The motor of claim 1, including a ring of a material having a high coefficient of friction mounted between said rim and one of said axially spaced apart portions of said frame, said ring being compressed between said rim and said one portion with sufficient tightness so that said rim is restrained from rotating relative to said frame under the influence of vibrations in said motor.

References Cited

UNITED STATES PATENTS

| | | | |
|---|---|---|---|
| 1,043,325 | 11/1912 | Lincoln | 310—241 |
| 1,517,281 | 12/1924 | Ehrlich | 310—241 |
| 1,708,541 | 4/1929 | House | 310—241 |
| 1,770,247 | 7/1930 | Titterington | 310—241 |
| 1,829,856 | 11/1931 | Edison | 310—239 |
| 3,313,966 | 4/1967 | Kasajima | 310—239 |
| 3,339,098 | 8/1967 | Burrows | 310—239 |

FOREIGN PATENTS

| | | |
|---|---|---|
| 367,965 | 1/1923 | Germany. |
| 167,909 | 6/1934 | Switzerland. |

MILTON O. HIRSHFIELD, Primary Examiner

R. SKUDY, Assistant Examiner